(12) United States Patent
Barzacanos et al.

(10) Patent No.: US 7,636,920 B2
(45) Date of Patent: Dec. 22, 2009

(54) METHOD AND APPARATUS FOR MAINTAINING STATE INFORMATION IN AN EVENT DRIVEN THIN CLIENT ENVIRONMENT

(75) Inventors: Constantine Barzacanos, New York, NY (US); Craig Miller, Louisville, CO (US); Moiz Raja, Milpitas, CA (US); Nair S. Rankarajan, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 514 days.

(21) Appl. No.: 11/168,974

(22) Filed: Jun. 27, 2005

(65) Prior Publication Data
US 2006/0294181 A1 Dec. 28, 2006

(51) Int. Cl.
*G06F 13/00* (2006.01)
(52) U.S. Cl. ...................................... 719/318
(58) Field of Classification Search .................. 719/318
See application file for complete search history.

(56) References Cited
U.S. PATENT DOCUMENTS

| | | | |
|---|---|---|---|
| 6,886,170 B1 * | 4/2005 | Bahrs et al. | 719/318 |
| 7,181,686 B1 * | 2/2007 | Bahrs | 715/526 |
| 2004/0117802 A1 * | 6/2004 | Green | 719/318 |
| 2004/0186860 A1 * | 9/2004 | Lee et al. | 707/200 |
| 2004/0250262 A1 * | 12/2004 | Irassar et al. | 719/318 |

* cited by examiner

*Primary Examiner*—Andy Ho
(74) *Attorney, Agent, or Firm*—Chapin IP Law, LLC; David W. Rouille, Esq.

(57) ABSTRACT

Methods and apparatus are provided for maintaining state information in an event driven thin client environment. A server-based method is provided for updating a presentation in an event driven, thin client device, comprising the steps of detecting a new presentation event; and sending a notification call to the client device containing information related to the presentation event to be recorded in a data model on the client device. A client-based method is provided for updating a presentation in an event driven, thin client device, comprising the steps of receiving a new presentation event from an application controller on an application server; and updating a local data model on the client device with information related to the presentation event. In addition, the presentation on the client device can optionally be updated based on the information related to the presentation event.

17 Claims, 2 Drawing Sheets

METHOD AND APPARATUS FOR MAINTAINING STATE INFORMATION IN AN EVENT DRIVEN THIN CLIENT ENVIRONMENT

FIELD OF THE INVENTION

The present invention generally relates to the management of events and associated data in an asynchronous thin client environment, and more particularly, to methods and apparatus for maintaining state information in an event driven thin client environment.

BACKGROUND OF THE INVENTION

A thin client is a client program or hardware device that relies on the server to provide most of the functionality of the system. Many thin clients, for example, are stateless objects that do not need to interpret or display objects beyond menus or plain text. Increasingly, thin client implementations of applications are being proposed in LAN and WAN-based environments. A thin client implementation allows for an efficient deployment and maintenance of an application. For traditional, full-featured clients, installation of a new application typically required physical installation on each user device. A thin client implementation of an application, on the other hand, allows for centralized deployment and maintenance. In addition, thin clients generally have fewer hardware demands.

Currently, most thin client applications employ J2EE (Java 2, Enterprise Edition) messaging protocols, such as Java Messaging Services (JMS). JMS, however, is designed to solve transaction-based architectures and is not an event driven model. Generally, a transaction-based server responds to client requests without significant time constraints. A server in an event driven model, however, often has fine-grained event generation demands. In particular, as a user takes an action to initiate an event, such as a keystroke or mouse click, the user expects the visual presentation of the application on the client device to update quickly. It has been found, however, that JMS cannot satisfy the time constraints and dependencies associated with many event driven client applications.

A need therefore exists for a messaging service that can satisfy the time constraints and dependencies associated with evolving event-driven client applications. A further need exists for methods and apparatus for maintaining state information in a highly event driven thin client environment.

SUMMARY OF THE INVENTION

Generally, methods and apparatus are provided for maintaining state information in an event driven thin client environment. According to one aspect of the invention, a server-based method is provided for updating a presentation in an event driven, thin client device, comprising the steps of detecting a new presentation event; and sending a notification call to the client device containing information related to the presentation event to be recorded in a data model on the client device. The data model records event states and associated data payload and may be accessed by an interested entity within a client environment. The presentation event can be defined by one or more predefined conditions and the information in the notification can be based on one or more predefined rules.

According to another aspect of the invention, a method is provided for updating a presentation in an event driven, thin client device, comprising the steps of receiving a new presentation event from an application controller on an application server; and updating a local data model on the client device with information related to the presentation event. In addition, the presentation on the client device can optionally be updated based on the information related to the presentation event.

A more complete understanding of the present invention, as well as further features and advantages of the present invention, will be obtained by reference to the following detailed description and drawings.

DETAILED DESCRIPTION

The present invention provides methods and apparatus for maintaining state information in an event driven thin client environment. The present invention satisfies the time constraints and dependencies associated with many event driven client applications by transferring the responsibility for updating the visual presentation to the client device. In this manner, the presentation on the client device can be updated with low latency in real-time.

A conventional client, based on a transactional model, will typically encode each user action as an HTTP request that is transmitted to a central application server. Thereafter, the client device enters a wait mode until a response to the request is received, that indicates how the client should react to the user action. Among other benefits, the event-driven approach of the present invention decouples the transmission of events to the application server from the updating of the presentation on the client device.

Figure 1:
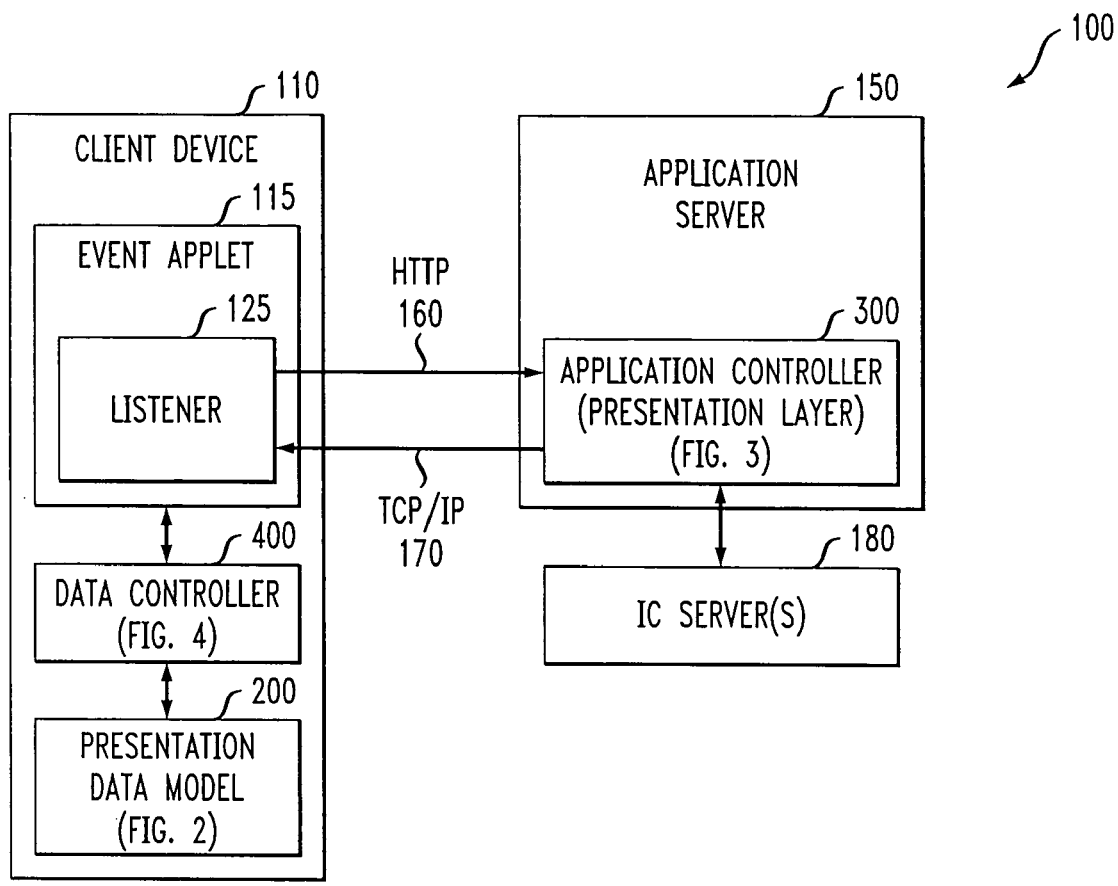
FIG. 1 illustrates a client-server environment incorporating features of the present invention.

FIG. 1 illustrates a client-server environment 100 incorporating features of the present invention. As shown in FIG. 1, a thin client device 110 communicates with an application server 150 in the client-server environment 100, for example, over a wired or wireless network (not shown). The thin client device 110 implements an event applet 115 provided by the application server 150. In the exemplary embodiment, the client device 110 may implement any thin client, event driven application, such as a multimedia contacts application that manages, for example, web, chat, electronic mail, and VoIP contacts for a user. The application may be, for example, launched from within a browser (not shown). In this manner, the user employs a graphical user interface, such as a mouse, to initiate desired actions, often referred to as "clicks."

The application server 150 may be, for example, an interface to a number of applications provided, for example, by one or more servers 180. The one or more servers 180 may be embodied, for example, as the Avaya Interaction Center™ server, commercially available from Avaya Corp. of Basking Ridge, N.J. Generally, the Avaya Interaction Center™ server allows an application to be shared by multiple users.

Generally, in one exemplary embodiment, a user action on the client device 110 is detected by an event applet 115, which notifies the application controller 300 within the presentation layer, discussed further below in conjunction with FIG. 3, on the application server 150. As discussed further below, the application controller 300 monitors for presentation related events (both from client devices 110, and from applications executing on the server(s) 180), and notifies a data controller 400, as discussed further below in conjunction with FIG. 4, on the client device 110 of the event.

The event notification is detected by a listener entity 125 and is then provided to the data controller 400 for processing.

According to one aspect of the invention, asynchronous event states and associated data are captured in a client side resident memory structure, referred to herein as a client side data model 200, discussed further below in conjunction with FIG. 2. The data model 200 records event states and the associated data payload as they "percolate" from the application server 150 to each client 110. The data model 200 is available to any interested entity within the client environment in an efficient way without the need to make a call out to the application server 150. While the present invention is illustrated in the context of a multimedia contact management application, the present invention can be applied to any highly event driven, thin-client application, as would be apparent to a person of ordinary skill in the art.

Any changes to the data model 200 will trigger a notification event by the application controller 300 to any component that has subscribed to, or expressed interest in, any changes occurring within the data model 200. As used herein, a change to the data model 200 is an addition, deletion or modification of information maintained within the data model 200. For example, when a new email arrives, the application controller 300 will publish the event(s) and the data associated with the email processing (such as topic, from, to, customer value, priority) within the data model 200. In this manner, client side components, such as the application re-paint function of the GUI, need only refer to the data model 200 for any changes (a client to client communication) rather than make an "expensive" transactional call to the application server 150.

Figure 2:
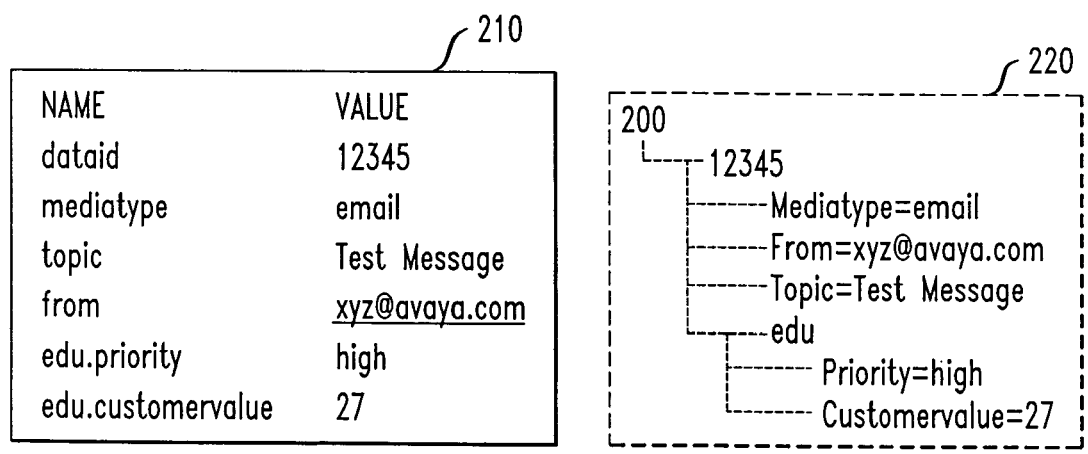
FIG. 2 illustrates an exemplary implementation of the data model in accordance with the present invention.

FIG. 2 illustrates an exemplary implementation of the data model 200. As previously indicated, the data model 200 maintains asynchronous event states and associated data in a client side resident memory structure. As shown in FIG. 2, the exemplary data model 200 comprises a number of records 210 stored in a hierarchical tree format 220 with name/value pairs related to presentation aspects, such as icons and other visual aspects, of the application.

The exemplary record 210 shown in FIG. 2 corresponds to a new email for the user associated with the client device 110. As discussed further below, an event corresponding to the receipt of a new email by the email server associated with the user is detected by the application controller 300. In response to the new event, the application controller 300 will send a corresponding notification to the data controller 400 associated with the client device 110. In one implementation, the notification will include the hierarchical tree format 220 shown in FIG. 2. The data controller 400 will update the local data model 200 with the information of the new email.

In this manner, the client device 110 will have the information necessary to update the visual presentation to indicate the receipt of a new email message without having to make a call to the application controller 300.

Figure 3:
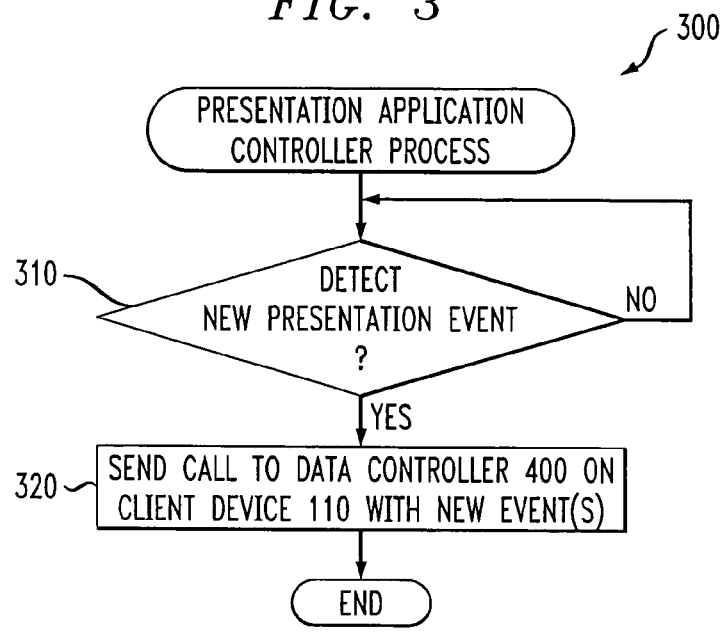
FIG. 3 is a flow chart describing an exemplary implementation of an application controller process incorporating features of the present invention.

FIG. 3 is a flow chart describing an exemplary implementation of an application controller process 300 incorporating features of the present invention. As shown in FIG. 3, the exemplary application controller 300 initially monitors to determine whether a new presentation event is detected. It is noted that what constitutes a "presentation event" is application specific, and the test performed during step 310 can monitor for one or more predefined criteria associated with a presentation event. It is further noted that the application controller 300 can receive a presentation event from a client device 110, such as a keystroke or click that affects the presentation, or from an application, such as the receipt of a new email.

Upon receipt of a new presentation event during step 310, the application controller process 300 will send a notification call to the data controller 400 of the client device 110 during step 320.

Figure 4:
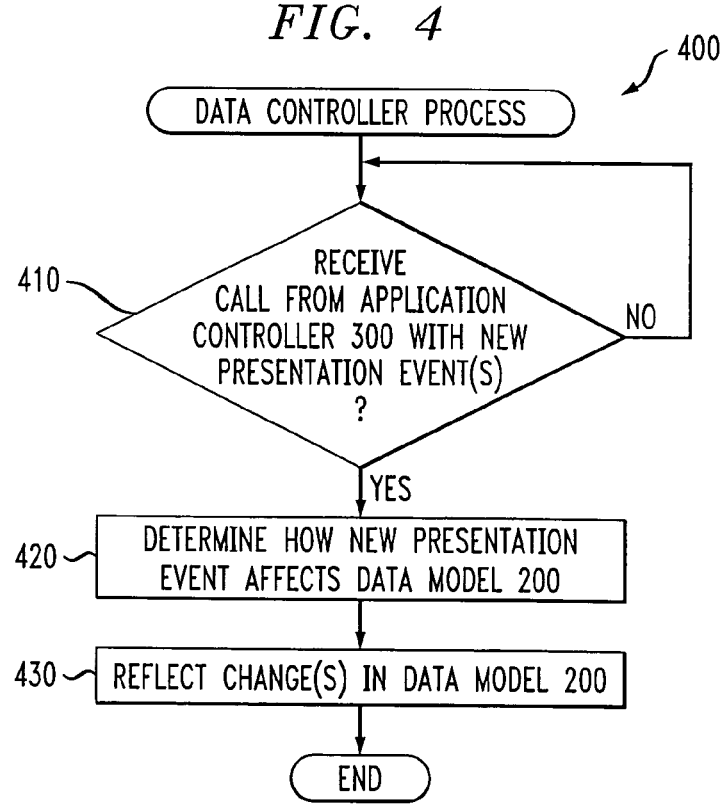
FIG. 4 is a flow chart describing an exemplary implementation of a data controller process incorporating features of the present invention.

FIG. 4 is a flow chart describing an exemplary implementation of a data controller process 400 incorporating features of the present invention. As shown in FIG. 4, the exemplary data controller process 400 initially monitors to determine whether a call is received from the application controller 300 with one or more new presentation events.

Upon receipt of a call from the application controller 300, the data controller process 400 will determine how the new presentation event affects the data model 200 during step 420. Again, the manner in which a new presentation event affects the data model 200 is application specific and can be implemented, for example, in accordance with one or more predefined rules or programming steps. Generally, the call received from the application controller 300 will indicate the portion of the data model 200 that must be updated. The appropriate change(s) to the data model 200 are implemented during step 430, before program control terminates.

It is noted that the changes to the data model 200 may be implemented, for example, by a Java Script that monitors for changes in the data model 200. For example, a Java Script may detect the node 220 that has been added to the data model 200 to reflect the receipt of a new email. The Java Script will update the presentation on the client device 110 in accordance with predefined rules in order to indicate that a new email has been received from xyz@avaya.com.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A server-based method for updating a presentation in an event drive, thin client device, comprising:
   detecting a new presentation event; and
   sending a notification call to said client device containing information related to said presentation event to be recorded in a data model on said client device, and wherein said data model may be accessed by an interested entity within a client environment, and wherein client side components refer to said data model for any changes rather than making a transaction call to an application server.

2. The method of claim 1, wherein said data model records event states and associated data payload.

3. The method of claim 1, wherein said presentation event is defined by one or more predefined rules.

4. The method of claim 1, wherein said information in said notification is based on one or more predefined rules.

5. A method for updating a presentation in an event driven, thin client device, comprising:
   receiving a new presentation event from an application controller on an application server; and
   updating a local data model on said client device with information related to said presentation event and wherein said data model may be accessed by an interested entity within a client environment, and wherein client side components refer to said data model for any changes rather than making a transaction call to an application server.

6. The method of claim 5, further comprising the step of updating a presentation on said client device based on said information related to said presentation event.

7. The method of claim 5, wherein said data model records event states and associated data payload.

8. The method of claim 5, wherein said presentation event is defined by one or more predefined conditions.

9. The method of claim 5, wherein said information in said notification is based on one or more predefined rules.

10. An application server, comprising:
    a memory; and
    at least one processor, coupled to the memory, operative to:
       detect a new presentation event; and
       send a notification call to a client device containing information related to said presentation event to be recorded in a data model on said client device and wherein said data model may be accessed by an interested entity within a client environment, and wherein client side components refer to said data model for any changes rather than making a transaction call to an application server.

11. The application server of claim 10, wherein said data model records event states and associated data payload.

12. The application server of claim 10, wherein said presentation event is defined by one or more predefined conditions.

13. The application server of claim 10, wherein said information in said notification is based on one or more predefined rules.

14. An event driven, thin client device, comprising:
    a memory for storing a data model with information related to one or more presentation events; and
    at least one processor, coupled to the memory, operative to:
       receive a new presentation event from an application controller on an application server; and
       update said data model with information related to said presentation event and wherein said data model may be accessed by an interested entity within a client environment, and wherein client side components refer to said data model for any changes rather than making a transaction call to an application server.

15. The client device of claim 14, wherein said processor is further configured to update a presentation on said client device based on said information related to said presentation event.

16. The client device of claim 14, wherein said presentation event id defined by one or more predefined conditions.

17. The client device of claim 14, wherein said information in said notification is based on one or more predefined rules.

* * * * *